(12) United States Patent
Ouyang et al.

(10) Patent No.: US 11,108,695 B2
(45) Date of Patent: Aug. 31, 2021

(54) METHOD, SYSTEM AND DEVICE FOR ADJUSTING LOAD OF RESOURCE SERVER

(71) Applicant: Wangsu Science & Technology Co., Ltd., Shanghai (CN)

(72) Inventors: Dezhi Ouyang, Shanghai (CN); Benli Song, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/869,141

(22) Filed: May 7, 2020

(65) Prior Publication Data

US 2020/0382423 A1    Dec. 3, 2020

Related U.S. Application Data

(63) Continuation of application No. PCT/CN2019/090320, filed on Jun. 6, 2019.

(30) Foreign Application Priority Data

May 9, 2019   (CN) .......................... 201910383394.6

(51) Int. Cl.
*H04L 12/803*     (2013.01)
*H04L 12/26*      (2006.01)
(Continued)

(52) U.S. Cl.
CPC .......... *H04L 47/125* (2013.01); *H04L 43/062* (2013.01); *H04L 43/0811* (2013.01);
(Continued)

(58) Field of Classification Search
None
See application file for complete search history.

(56) References Cited

U.S. PATENT DOCUMENTS

| 6,754,706 B1* | 6/2004 | Swildens | ................ H04L 29/06 |
| | | | 709/219 |
| 2002/0021665 A1* | 2/2002 | Bhagavath | .............. H04L 43/00 |
| | | | 370/229 |

(Continued)

FOREIGN PATENT DOCUMENTS

| CN | 101141817 A | 3/2008 |
| CN | 101753444 A | 6/2010 |

(Continued)

*Primary Examiner* — Joshua Joo
(74) *Attorney, Agent, or Firm* — USCH Law, PC

(57) ABSTRACT

The present disclosure discloses a method, a system and a device for adjusting a load of a resource server. The method is applicable to a scheduling system and includes: determining a quality fluctuating value of the resource server in a current detection period in accordance with a historical feature value of the resource server and an operation data recorded in the current detection period; reading a load weight value currently used by the resource server, adjusting the load weight value currently used by the resource server based on the determined quality fluctuating value, and setting the adjusted load weight value as the load weight value of the resource server after the current detection period. The technical solution in the present disclosure improves an overall stability of the system.

19 Claims, 4 Drawing Sheets

---

S1: A quality fluctuating value of the resource server in a current detection period is determined in accordance with a historical feature value of the resource server and an operation data recorded in the current detection period.

S3: A load weight value currently used by the resource server is read, and the load weight currently used by the resource server is adjusted based on the determined quality fluctuating value, and the adjusted load weight value is taken as the load weight of the resource server after the current detection period.

(51) Int. Cl.
*H04L 12/801* (2013.01)
*H04L 12/911* (2013.01)

(52) U.S. Cl.
CPC .............. *H04L 43/16* (2013.01); *H04L 47/29* (2013.01); *H04L 47/783* (2013.01)

(56) References Cited

U.S. PATENT DOCUMENTS

| | | | |
|---|---|---|---|
| 2016/0088072 A1 | 3/2016 | Likhtarov et al. | |
| 2016/0094643 A1* | 3/2016 | Jain | H04L 45/44 709/226 |
| 2016/0164787 A1* | 6/2016 | Roach | H04L 43/065 370/235 |
| 2016/0173584 A1* | 6/2016 | Fitzpatrick | H04L 69/16 709/223 |
| 2018/0367500 A1* | 12/2018 | Rugged | H04L 29/08072 |
| 2019/0149482 A1* | 5/2019 | Kumar | H04L 29/0827 709/226 |
| 2019/0238630 A1* | 8/2019 | Reynolds | G06F 11/0709 |
| 2019/0253490 A1* | 8/2019 | Du | G06F 9/5088 |
| 2020/0026458 A1* | 1/2020 | Flowers | G06F 3/0644 |

FOREIGN PATENT DOCUMENTS

| | | |
|---|---|---|
| CN | 103368864 A | 10/2013 |
| CN | 106998340 A | 8/2017 |
| CN | 107124472 A | 9/2017 |
| CN | 107196869 A | 9/2017 |
| CN | 107295048 A | 10/2017 |
| CN | 109120715 A | 1/2019 |

* cited by examiner

METHOD, SYSTEM AND DEVICE FOR ADJUSTING LOAD OF RESOURCE SERVER

CROSS REFERENCE TO RELATED APPLICATIONS

The present application is a continuation of PCT Application No. PCT/CN2019/090320, entitled "Method, System and Device for Adjusting Load of Resource Server," filed Jun. 6, 2019, which claims priority to Chinese patent application No. 201910383394.6, entitled "Method, System and Device for Adjusting Load of Resource Server," filed May 9, 2019, each of which is incorporated herein by reference in its entirety.

TECHNICAL FIELD

The present disclosure relates to the Internet technology, and in particular, to a method, a system and a device for adjusting a load of a resource server.

BACKGROUND

In a domain name resolution system, after receiving a domain name resolution request sent by a user client, a domain name resolution server can resolve a domain name carried in the domain name resolution request into a corresponding IP address. By feeding back the IP address to the user client, the domain name resolution server may enable the user client to access a resource server at the IP address. Since there can be a large quantity of resources under the same domain name, there can be a large number of resource servers under the same domain name, which share access traffic from a plurality of user clients.

Presently, a load weight value can be set for each resource server in advance. After access traffic from the user client is received, the access traffic can be assigned among the resource servers in accordance with their load weight values. In this way, use of processing performance of each resource servers can be maximized.

In existing technologies, a load weight value set for each resource server is fixed. In practical applications, actual performance of the resource server can change at any time. However, even if processing performance of a certain resource server is reduced, the domain name resolution server can still assign the original access traffic to the resource server in accordance with the fixed load weight value, which causes the resource server to fail to process the assigned access traffic timely and efficiently, and to even go down due to an excessive load. Therefore, an overall system stability is insufficient in the existing technologies.

SUMMARY

An objective of the present disclosure is to provide a method, a system and a device for adjusting a load of a resource server, which may improve an overall stability of a system.

In accordance with some embodiments, in order to achieve the above-described objective, one aspect of the present disclosure provides a method for adjusting a load of a resource server. The method includes: determining a quality fluctuating value of the resource server in a current detection period in accordance with a historical feature value of the resource server and an operation data recorded in the current detection period; and reading a load weight value currently used by the resource server, adjusting the load weight value currently used by the resource server based on a determined quality fluctuating value, and taking an adjusted load weight value as a load weight value of the resource server after the current detection period.

In accordance with some embodiments, in order to achieve the above-mentioned objective, the present disclosure further provides a system for adjusting a load of a resource server. The system includes: a unit for determining a quality fluctuating value, configured to determine a quality fluctuating value of the resource server in a current detection period in accordance with a historical feature value of the resource server and an operation data recorded in the current detection period; and a unit for adjusting a load weight value, configured to read a load weight value currently used by the resource server, and adjust the load weight value currently used by the resource server based on a determined quality fluctuating value, and take an adjusted load weight value as the load weight value of the resource server after the current detection period.

In accordance with some embodiments, in order to achieve the above-mentioned objective, the present disclosure further provides a device for adjusting a load of a resource server. The device includes a processor and a memory, where the memory is configured to store a computer program, and the computer program is executed by the processor to implement the above-mentioned method for adjusting a load of the resource server.

In accordance with some embodiments, in order to achieve the above-mentioned objective, the present disclosure further provides a computer storage medium storing a computer program, and the computer program is executed by a processor to implement the above-mentioned method for adjusting a load of the resource server.

It is seen from the above-described, the technical solution in the present disclosure, may perform a detection in a plurality of detection periods for recorded operation data. During the current detection period, the historical feature value of the resource server may be obtained through calculation, and the historical feature value may be used to characterize service performance of the resource server up to now. Based on the historical feature value and the operation data recorded in the current detection period, a quality fluctuating value of the resource server in the current detection period may be determined. The quality fluctuating value may be taken as a basis for adjusting a load weight value of the resource server. Subsequently, the load weight value of the resource server after the last detection period may be read, and the load weight value may be taken as a load weight value currently used by the resource server. Then, the load weight value currently used by the resource server may be dynamically adjusted in accordance with the quality fluctuating value calculated through the above-mentioned, so that an adjusted load weight value matches a current processing performance of the resource server. In this way, when the current processing performance of the resource server lowers, an access traffic assigned to the resource server is also appropriately reduced, and when the current processing performance of the resource server is improved, the access traffic assigned to the resource server is appropriately increased. Therefore, by dynamically adjusting the load weight value of the resource server, an overall stability of the system can be improved.

BRIEF DESCRIPTION OF THE DRAWINGS

In order to describe technical solutions in embodiments of the present disclosure more clearly, the drawings used in the description of the embodiments are briefly introduced below. Obviously, the drawings described below show only some embodiments of the present disclosure. For those skilled in the art, further drawings may be obtained in accordance with these drawings without any inventive effort.

DETAILED DESCRIPTION

In order to make objectives, technical solutions and advantages of the present disclosure clearer, embodiments of the present disclosure are explained below in detail with reference to accompanying drawings.

The present disclosure provides a method for adjusting a load of a resource server. The method may be applied to a Global Traffic Manager (GTM) scheduling system, and the GTM scheduling system may perform quality monitoring and log collection for a plurality of resource servers under a target domain name, and dynamically adjust a load weight value of the resource servers.

Figure 1:
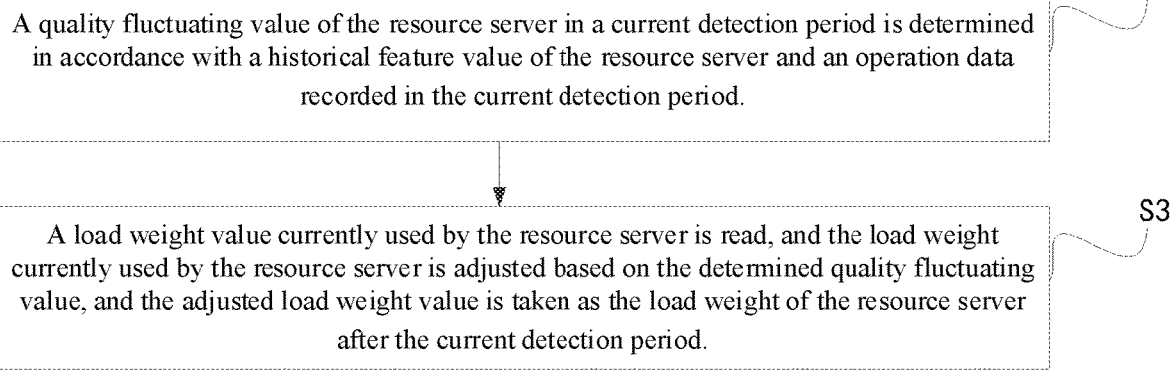
FIG. 1 is a schematic diagram of a method for adjusting a load of a resource server in an embodiment of the present disclosure.
Figure 2:
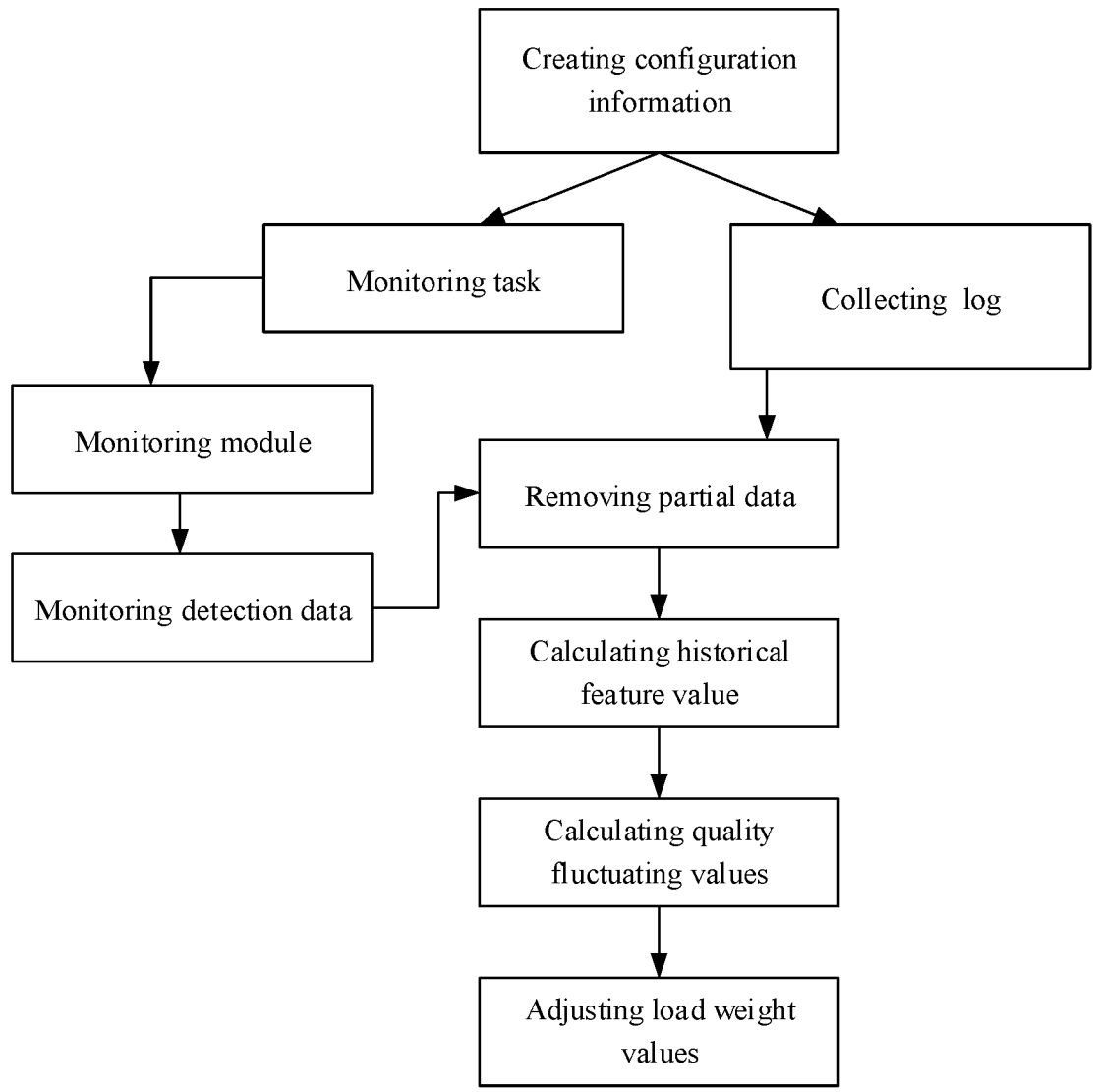
FIG. 2 is a flowchart of a method for adjusting a load of a resource server in an embodiment of the present disclosure.

Specifically, with reference to FIGS. 1 and 2, the method may include the following steps.

At S1, a quality fluctuating value of the resource server in a current detection period is determined in accordance with a historical feature value of the resource server and an operation data recorded in the current detection period.

In one embodiment, configuration information of each resource server under a target domain name may be created in advance, and operation data of the resource server may be recorded in accordance with the configuration information, and a historical feature value of the resource server in the current detection period may be calculated based on the recorded operation data.

In this embodiment, the target domain name may be any domain name of which the load weight value is needed to be adjusted dynamically. There may be a plurality of resource servers under the target domain name, and these resource servers share an access traffic directed to the target domain name together.

In the GTM scheduling system, the configuration information of the each resource server under the target domain name may be created in advance. The configuration information may include a plurality of items. For example, the configuration information may include a scheduling reference item, an IP addresses of the each resource server, an initial load weight value of the each resource server, a monitoring detection method for the each resource server, a monitoring detection frequency for the each resource server, and a detection frequency for the each resource server, and the like. Herein, the scheduling reference item may be a feature value for judging service quality of the resource server. The feature value may be, for example, a proportion of error codes, a packet loss rate, a delay, and the like. The initial load weight value may be generated in accordance with a performance index when the each resource server is initialized.

It shall be noted that the load weight value in the present disclosure may be a numerical value or a proportional value. For example, there are currently three resource servers. Load weight values of the three resource servers may be 10, 20 and 20, respectively. The load weight value may characterize a performance of the resource server. Subsequently, by calculating a proportion of the load weight value of the each resource server in a total load weight value, an assignment proportion of the access traffic among the three resource servers may be determined. For example, in accordance with the above-mentioned load weight values, load weight value proportions of the three resource servers may be respectively calculated to be 20%, 40% and 40%. Further, the load weight value may alternatively be directly expressed as a proportional value. For example, the above-mentioned 20%, 40% and 40% may be directly taken as load weight values.

The above-mentioned monitoring and detection method may be flexibly adjusted in accordance with a practical situation. For example, the monitoring detection method may be a TCP detection method, a HTTP detection method, or a PING detection method, and the like. The monitoring detection frequency may be a frequency for detecting the resource server by using the above-mentioned monitoring detection method. The detection frequency may be a frequency of analyzing a result of the above-mentioned monitoring detection and dynamically adjusting the load weight value of the resource server. In this embodiment, the GTM scheduling system may start a process of dynamically adjusting the load weight value for multiple times in accordance with the detection frequency. Each process of adjusting the load weight value may be taken as a detection period. The detection period usually lasts for a period of time, and then the performance of the resource server during this period of time may be evaluated, and the load weight value may be adjusted in accordance with an evaluation result. After adjusting the load weight value is completed, the current detection period is ended.

In this embodiment, after the configuration information is created for the each resource server under the target domain name, the operation data of the resource server may be recorded based on the configuration information. In practical applications, the operation data may include two aspects of data. On the one hand, a monitoring task may be generated for the resource server in accordance with the monitoring detection method and the monitoring detection frequency in the configuration information, and a monitoring result corresponding to the resource server may be recorded when the monitoring task is executed. Specifically, the generated monitoring task may include various items of information such as a detection target, a detection method, a detection port and a source of the detection target. Herein, the monitoring result may include such items of data as the packet loss rate, a state code, a connection number and the delay. On the other hand, the GTM scheduling system may further collect an operation log of the resource server located at a communication address in accordance with the communication address in the configuration information. The communication address may be an IP address of a resource server recorded in the configuration information. Through an access interface provided by the resource server located at the IP address, the GTM scheduling system may collect the operation log generated by the resource server during operation. The operation log may further contain such above-mentioned data as the packet loss rate, the state code, the connection number and the delay.

In this way, through monitoring and collecting a log of the resource server, the recorded monitoring result and the collected operation log may be taken as the operation data of the resource server. Subsequently, a process of adjusting the load weight value may be carried out based on the operation data.

In one embodiment, some of the recorded operation data may be invalid data or data characterizing the resource server is not applicable. In practical applications, these data needs to be removed in order to accurately adjust the load weight value of the resource server. Specifically, the above-mentioned data to be removed usually has certain characteristics. For example, for PING monitoring, TCP monitoring and HTTP monitoring, the invalid data usually carries an invalid state code which may, for example, be 0, 2, 3, 5, 7 and 9 in practical applications. These invalid state codes may be showed in a form of CODE!=(0, 2, 3, 5, 7, 9). Therefore, after the operation data is recorded, an operation data carrying the invalid state code may be identified from the operation data, and the operation data carrying the invalid state code may be removed from the recorded operation data. Further, the data characterizing the resource server is not applicable may have characteristics in such aspects as the packet loss rate, a connection state, the state code and the delay. For example, for the PING monitoring, a data with the packet loss rate equal to 100 may be taken as the data characterizing the resource server is not applicable. For the TCP monitoring, a data with the TCP connection state of 1 (state=1) may be taken as the data characterizing the resource server is not applicable. For the HTTP monitoring, other state codes other than a normal state code (e.g. state codes from 200 to 3XX) and other than a user-specified state code may be taken as an abnormal state code, and a data carrying the abnormal state code may be taken as the data characterizing the resource server is not applicable. Further, for the HTTP monitoring, a data with a delay exceeding an upper limit of the user-specified delay may also be taken as data the data characterizing the resource server is not applicable. In this way, an operation data characterizing a resource is not applicable in the resource server may be identified and removed from the recorded operation data.

It is certain that the above-exemplified cases is only intended to better understand the solutions of the present disclosure, and do not mean that the solutions of the present disclosure are only applied to the above-exemplified cases.

In this embodiment, after the invalid data and the data characterizing the resource server is not applicable are removed, the adjustment of the load weight value may be performed based on remaining data.

Figure 3:
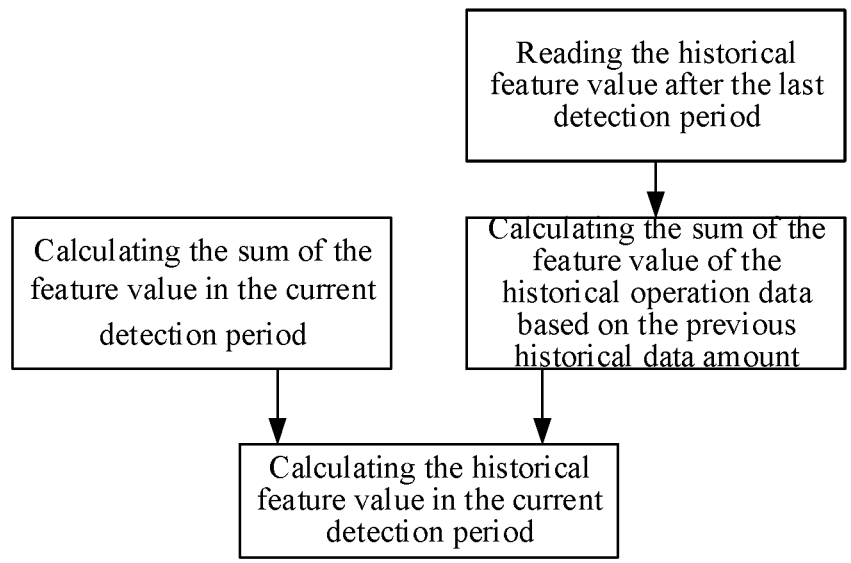
FIG. 3 is a schematic diagram of calculating a historical feature value in a current detection period in an embodiment of the present disclosure.

Specifically, the GTM scheduling system may calculate a historical feature value of the resource server in the current detection period based on the recorded operation data. The historical feature value may be taken as an average quality parameter of the resource server before (including) the current detection period. With reference to FIG. 3, in practical applications, a sum of a feature value of each operation data recorded in the current detection period may be calculated in advance. The feature value may be a parameter such as the packet loss rate, the delay, the proportion of error codes, and the like. Taking the delay as an example, a sum of the feature value may represent a sum of the delays of the each operation data in the current detection period. Specifically, the feature value of the each operation data in the current detection period may be totaled, and the totaled result is taken as a sum of the feature value of the operation data in the current detection period.

It shall be noted that in practical applications, the feature value of the each operation data in the current detection period may be defined. Specifically, if a feature value of a current operation data is greater than a preset threshold value, the feature value of the current operation data may be modified to the preset threshold value. For example, if the preset threshold value is a delay of 20 ms, then if the delay of a certain operation data in the current detection period is 30 ms, the delay of the operation data may be corrected to 20 ms. The sum of the delays of the each operation data in the current detection period may be calculated in accordance with a corrected result.

Then, the historical feature value of the resource server after the last detection period may be read. The historical feature value may be taken as an average quality parameter of the resource server characterized by other operation data other than the operation data in the current detection period. In accordance with the read historical feature value and a data amount of the historical operation data before the current detection period, a sum of a feature value of the historical operation data may be calculated. It shall be noted that the data amount of historical operation data before the current detection period does not include the data amount of operation data in the current detection period. In this way, when the sum of the feature value of the historical operation data is calculated, a product of the read historical feature value and the data amount of the historical operation data may be taken as the sum of the feature value of the historical operation data. Similarly, taking the delay as an example, the sum of the feature value of the historical operation data may represent the sum of the delays of the each historical operation data. Finally, the historical feature value of the resource server in the current detection period may be calculated in accordance with a sum of the feature value calculated in the current detection period and the sum of the feature value of the historical operation data. Specifically, a total data amount of the operation data recorded in the current detection period and the historical operation data may be calculated. And then, the sum of the feature value calculated in the current detection period and the sum of the feature value of the historical operation data may be totaled, and a ratio of the totaled result and the total data amount is taken as the historical feature value of the resource server in the current detection period.

In one application example, the historical feature value of the resource server in the current detection period may be expressed by the following formula:

$$h_t = \frac{h_{t-1} \times (hc - cc) + \sum c_k}{hc}$$

Herein, $h_t$ denotes the historical feature value in the current detection period, $h_{t-1}$ denotes the historical feature value after the last detection period, hc may denote a data amount of all the historical operation data including the operation data in the current detection period, CC denotes a data amount of the operation data in the current detection period. In this way, hc−cc may denote the data amount of the historical operation data before the current detection period (excluding data amount in the current detection period), $c_k$ denotes a feature value of the k-th operation data in the current detection period, and $\Sigma c_k$ may denote the sum of the feature value of the operation data in the current detection period.

In this way, through the above-mentioned calculation process, the average quality parameter of the resource server before (including) the current detection period may be obtained. The average quality parameter may be the historical feature value in the above-mentioned current detection period.

It may be seen from the above-described that when the historical feature value in the current detection period is calculated, other historical operation data before the current detection period are also needed. The purpose of such processing is to make a change to the historical feature value relatively smooth and avoid a significant change to the historical feature value due to particularity of partial data, thereby ensuring accuracy of the data.

In this embodiment, the historical feature value calculated may be taken as the average quality parameter of all the historical operation data including those in the current detection period. Therefore, an actual feature value of the each operation data in the current detection period may be compared with the historical feature value, so as to judge whether the performance of the resource server significantly rises and falls in the current detection period.

Figure 4:
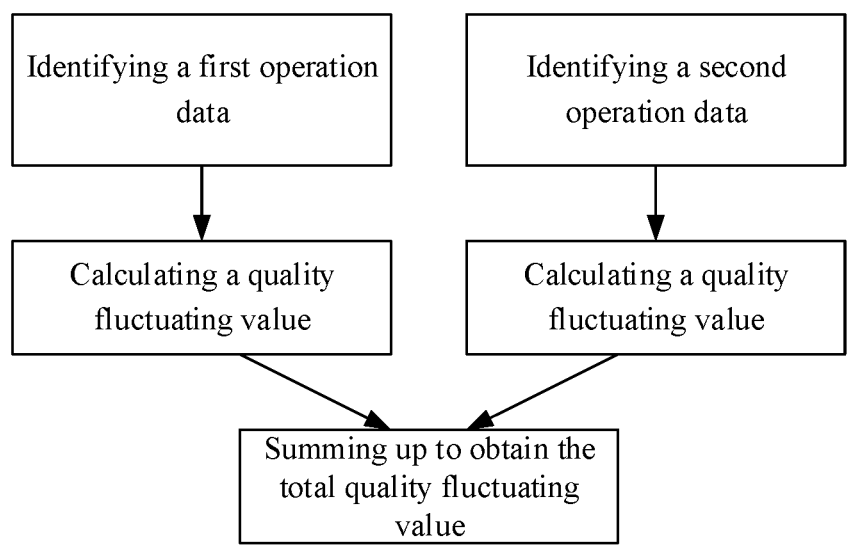
FIG. 4 is a schematic diagram of calculating a quality fluctuating value in an embodiment of the present disclosure.

Specifically, with reference to FIG. 4, a first operation data with the feature value greater than the historical feature value and a second operation data with the feature value smaller than or equal to the historical feature value may be identified in the operation data recorded in the current detection period. In this way, the first operation data and the second operation data may respectively represent different types of data. In practical applications, the first operation data and the second operation data may respectively represent different service qualities of the resource server. Taking the delay as an example, the historical feature value may be a historical delay average value. If a delay of the operation data recorded in the current detection period is greater than the historical delay average value, it denotes that the resource server has a poor service quality. However, if the delay of the operation data recorded in the current detection period is less than or equal to the historical average delay, it denotes that the service quality of the resource server is good. At this time, quality fluctuating values may be calculated for the first operation data and the second operation data respectively. Since the first operation data and the second operation data respectively represent a good service quality and a bad service quality, the two quality fluctuating values calculated are usually a positive one and a negative one. At this time, a sum of the two quality fluctuating values calculated may be taken as a quality fluctuating value of the resource server in the current detection period. That is to say, the operation data characterizing the poor service quality of the resource server may cause the quality fluctuating value to incline to being negative, while the operation data characterizing the good service quality of the resource server may cause the quality fluctuating value to incline to being positive.

Specifically, in one application example, a quality fluctuating value in the current detection period may be expressed by the following formula:

$$S = \left(\sum_{i=1}^{m} \frac{h_t - y_i}{h_t} + \sum_{j=1}^{n} \frac{h_t - x_j}{u - h_t}\right) \times \frac{100}{datacount}$$

Herein, S denotes the quality fluctuating value in the current detection period, $y_i$ denotes a feature value of the i-th data in the first operation data, $x_j$ denotes a feature value of the j-th data in the second operation data, u denotes a preset threshold value for correcting the feature value of the current operation data, datacount denotes a total quantity of data in the current detection period, m denotes a total quantity of data in the first operation data, and n denotes a total quantity of data in the second operation data.

In the above-mentioned formula, $$\sum_{i=1}^{m} \frac{h_t - y_i}{h_t} \times \frac{100}{datacount}$$

may denote a quality fluctuating value of the first operation data, and $$\sum_{j=1}^{n} \frac{h_t - x_j}{u - h_t} \times \frac{100}{datacount}$$

may represent a quality fluctuating value of the second operation data.

At S3, a load weight value currently used by the resource server is read, and the load weight value currently used by the resource server is adjusted based on the determined quality fluctuating value, and an adjusted load weight value is taken as the load weight value of the resource server after the current detection period.

In this embodiment, after the quality fluctuating value in the current detection period is calculated, the quality fluctuating value may be compared with a specified fluctuating range, so that the load weight value currently used by the resource server may be adjusted correspondingly.

Specifically, the load weight value currently used by the resource server may be a load weight value adjusted and obtained after the last detection period. If there is no last detection period, the load weight value currently used by the resource server may be an initial load weight value in the configuration information.

In this embodiment, if the determined quality fluctuating value is within the specified fluctuating range, it indicates that a quality fluctuation in the current detection period is allowed. At this time, the load weight value currently used by the resource server may be kept unchanged. If the determined quality fluctuating value is greater than an upper limit value of the specified fluctuating range, it indicates that the service quality of the resource server is greatly improved in the current detection period, and the resource server has a high processing performance at this time. Therefore, the load weight value currently used by the resource server may be adjusted and increased in accordance with a preset adjustment amplitude. The preset adjustment amplitude may be a preset fixed value, and the preset adjustment amplitude is taken as an adjustment unit when the load weight value needs to be adjusted. If the determined quality fluctuating value is less than a lower limit value of the specified fluctuating range, it indicates that the service quality of the resource server has decreased greatly in the current detection period, and a processing performance of the resource server is poor at this time. Therefore, the load weight value currently used by the resource server may be reduced in accordance with the preset adjustment amplitude.

In this embodiment, after a process of adjusting the load weight value in the current detection period is completed, the adjusted load weight value may be taken as the load weight value of the resource server after the current detection period. Specifically, if the adjusted load weight value is within a range of the load weight value, it indicates that the adjusted load weight value is relatively reasonable and thus the adjusted load weight value may be taken as the load weight value of the resource server after the current detection period. However, if the adjusted load weight value is greater than an upper limit value of the specified range of the load weight value, it indicates that the adjusted load weight value in accordance with the preset adjustment amplitude is too large. At this time, the upper limit value of the specified range of the load weight value may be taken as the load weight value of the resource server after the current detection period. On the contrary, if the adjusted load weight value is less than the lower limit value of the specified range of the load weight value, it indicates that the adjusted load weight value in accordance with the preset adjustment amplitude is too small. At this time, the lower limit value of the specified range of the load weight value may be taken as the load weight value of the resource server after the current detection period.

In one embodiment, in a case that a quality fluctuating value characterizing a processing performance of a resource server is degraded, a falling value of the quality fluctuating value of the current resource server reaches a preset falling threshold value indicates that the current resource server under a target domain name has a poor processing performance. At this time, the load weight value of the current resource server may be kept unchanged, while a load weight value of another resource server other than the current resource server under the target domain name may be increased. In this way, the load weight value of the current resource server is decreased in a disguised form, so that more access traffic may be assigned to the other resource server.

In this embodiment, after adjusting a load weight value of each resource server under the target domain name is completed, a GTM scheduling system may send a scheduling policy characterizing each adjusted load weight value to a DNS authoritative server, so that the DNS authoritative server may assign an access request directed to the target domain name to the each resource server in accordance with each load weight value characterized by the scheduling policy. In this way, the DNS authoritative server may dynamically change an assigning policy of the access request after each detection period, so that the number of access requests processed by the resource server matches its own processing performance.

Figure 5:
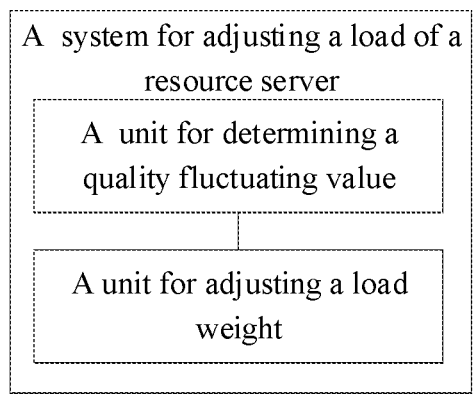
FIG. 5 is a schematic diagram of a function module of a system for adjusting a load of a resource server in an embodiment of the present disclosure.

With reference to FIG. 5, the present disclosure further provides a system for adjusting a load of a resource server. The system includes:

a unit for determining a quality fluctuating value, configured to determine a quality fluctuating value of the resource server in a current detection period in accordance with a historical feature value of the resource server and an operation data recorded in the current detection period; and a unit for adjusting a load weight value, configured to read a load weight value currently used by the resource server, and adjust the load weight value currently used by the resource server based on the determined quality fluctuating value, and take the adjusted load weight value as the load weight value of the resource server after the current detection period.

In one embodiment, the system further includes:

a unit for recording a monitoring result, configured to generate a monitoring task for the resource server in accordance with a monitoring detection method and a monitoring detection frequency, and record a monitoring result corresponding to the resource server when the monitoring task is executed;

a unit for collecting an operation log, configured to collect an operation log of the resource server located at a communication address; and a unit for determining an operation data, configured to take the recorded monitoring result and the collected operation log as the operation data of the resource server.

In one embodiment, the system further includes:

a first removing unit, configured to identify and remove an operation data carrying an invalid state code from the operation data; and a second removing unit, configured to identify and remove an operation data characterizing a resource in the resource server is not applicable from the operation data.

In one embodiment, the system further includes a unit for calculating a historical feature value, which includes:

a module for calculating a sum of a feature value in current detection period, configured to calculate the sum of the feature value of each operation data recorded in the current detection period;

a module for calculating a sum of a feature value of a historical operation data, configured to read the historical feature value of the resource server after a last detection period, and calculate a sum of a feature value of the historical operation data in accordance with a read historical feature value and a data amount of the historical operation data before the current detection period; and a module for calculating a historical feature value, configured to calculate the historical feature value of the resource server in the current detection period in accordance with the sum of the feature value calculated in the current detection period and the sum of the feature value of the historical operation data.

In one embodiment, the module for calculating a sum of a feature value in current detection period includes:

a totaling module, configured to total the feature value of the each operation data in the current detection period, and take the totaled result as the sum of the feature value of the each operation data in the current detection period, where a feature value of a current operation data is modified to a preset threshold value if the feature value of the current operation data is greater than the preset threshold value.

In one embodiment, the module for calculating a sum of a feature value of a historical operation data includes:

a product module, configured to take a product of the read historical feature value and the data amount of the historical operation data as the sum of the feature value of the historical operation data.

In one embodiment, the module for calculating a historical feature value includes:

a module for calculating a total data amount, configured to calculate a total data amount of the operation data recorded in the current detection period and the historical operation data; and a module for calculating a ratio, configured to total the sum of the feature values calculated in the current detection period and the sum of the feature values of the historical operation data, and take a ratio of a totaled result and the total data amount as the historical feature value of the resource server in the current detection period.

In one embodiment, the unit for determining a quality fluctuating value includes:

a module for identifying an operation data, configured to identify a first operation data with a feature value greater than the historical feature value and a second operation data with a feature value smaller than or equal to the historical feature value in the operation data recorded in the current detection period; and a module for calculating a quality fluctuating value, configured to calculate quality fluctuating values respectively for the first operation data and the second operation data, and take a sum of calculated quality fluctuating values as the quality fluctuating value of the resource server in the current detection period.

In one embodiment, the load weight value adjustment unit includes:

a keeping module, configured to keep the load weight value currently used by the resource server unchanged if the determined quality fluctuating value is within a specified fluctuating range;

an increasing module, configured to increase the load weight value currently used by the resource server in accordance with a preset adjustment amplitude if the determined quality fluctuating value is greater than an upper limit value of the specified fluctuating range; and a reducing module, configured to reduce the load weight value currently used by the resource server in accordance with the preset adjustment amplitude if the determined quality fluctuating value is smaller than a lower limit value of the specified fluctuating range.

In one embodiment, the unit for adjusting a load weight value includes:

a first determination module, configured to take the adjusted load weight value as the load weight value of the resource server after the current detection period if the adjusted load weight value is within a specified range of the load weight value;

a second determination module, configured to take an upper limit value of the specified range of the load weight value as the load weight value of the resource server after the current detection period if the adjusted load weight value is greater than the upper limit value of the specified range of the load weight value; and a third determination module, configured to take a lower limit value of the specified range of the load weight value as the load weight value of the resource server after the current detection period if the adjusted load weight value is smaller than the lower limit value of the specified range of the load weight value.

In one embodiment, the unit for adjusting a load weight value includes:

a module for control a falling value, configured to hold a load weight value of a current resource server, and increase a load weight value of another resource server other than the current resource server under a target domain name if a falling value of the quality fluctuating value of the current resource server reaches a preset falling threshold value.

In one embodiment, the system further includes:

a unit for sending a scheduling policy, configured to send a scheduling policy characterizing each adjusted load weight value to a DNS authoritative server after adjusting a load weight value of the each resource server under a target domain name is completed, so that an access request directed to the target domain name is assigned among the each resource server by the DNS authoritative server in accordance with the each load weight value characterized by the scheduling policy.

The present disclosure further provides a device for adjusting a load of a resource server. The device includes a processor and a memory, where the memory is configured to store a computer program, and the computer program is executed by the processor to implement the above-mentioned method for adjusting a load of the resource server.

The present disclosure further provides a computer storage medium storing a computer program, and the computer program is executed by a processor to implement the above-mentioned method for adjusting a load of the resource server.

The memory and the computer storage medium may include a physical device for storing information. Generally, the information is digitalized and stored by media using electronic, magnetic or optical methods. The memory and the computer storage medium described in this embodiment may further include: devices for storing information using electric energy method, such as a RAM, a ROM, and the like; devices for storing information using magnetic energy method, such as a hard disk, a floppy disk, a magnetic tape, a magnetic core memory, a magnetic bubble memory, a U-disk; and devices for storing information using an optical method, such as a CD and a DVD. Of course, there are memories for storing information in other methods, such as a quantum memory, a graphene memory and the like.

In this embodiment, the processor may be implemented in any suitable manner. For example, the processor may take a form of, for example, a microprocessor or a processor and a computer readable medium (e.g. software or firmware) storing a computer readable program code executable by the (micro)processor, a logic gate, a switch, an application specific integrated circuit (ASIC), a programmable logic controller, an embedded microcontroller and the like.

It is seen from the above-described that the technical solution in the present disclosure may perform a detection in a plurality of detection periods for recorded operation data. During a current detection period, a historical feature value of a resource server may be obtained through calculation, and the historical feature value may be used to characterize service performance of the resource server up to now. Based on the historical feature value and the operation data recorded in the current detection period, a quality fluctuating value of the resource server in the current detection period may be determined. The quality fluctuating value may be taken as a basis for adjusting a load weight value of the resource server. Subsequently, the load weight value of the resource server after the last detection period may be read, and the load weight value may be taken as a load weight value currently used by the resource server. Then, the load weight value currently used by the resource server may be dynamically adjusted in accordance with the quality fluctuating value calculated through the above-mentioned, so that an adjusted load weight value matches a current processing performance of the resource server. In this way, when the current processing performance of the resource server lowers, an access traffic assigned to the resource server is also appropriately reduced, and when the current processing performance of the resource server is improved, the access traffic assigned to the resource server is appropriately increased. Therefore, by dynamically adjusting the load weight value of the resource server, an overall stability of the system may be improved.

From the description of the above embodiments, those skilled in the art may clearly understand that each embodiment may be implemented by means of a software plus a necessary general hardware platform, and of course, may further be implemented by means of a hardware. Based on such understanding, the above-mentioned technical solution essentially or a part contributing to the existing technology may be embodied in the form of a software product. The computer software product may be stored in a computer readable storage medium such as a ROM/RAM, a magnetic disk, an optical disk or the like, and includes several instructions to cause a computer device (which may be a personal computer, a server, a network device, or the like) to execute the methods described in each embodiment or some parts of the embodiments.

The above descriptions are merely preferred embodiments of the present disclosure, and are not intended to limit the present disclosure. Any modifications, equivalent substitutions, improvements or the like made within the spirit and principles of the present disclosure shall fall within the scope of protection of the present disclosure.

What is claimed is:

1. A method for adjusting loads of a plurality of resource servers under a target domain name, applied to a scheduling system, the method comprising:
   for each respective resource server of the plurality of resource servers:
   recording operation data of the respective resource server through an access interface provided by the respective resource server located at a respective IP address of the respective resource server;
   determining a quality fluctuating value of the respective resource server in a current detection period in accordance with a historical feature value of the respective resource server and operation data of the respective resource server recorded in the current detection period, wherein the historical feature value is calculated based on operation data of the respective resource server, and the historical feature value indicates an average quality parameter of the respective resource server over the current detection period and one or more previous detection periods; and
   reading a load weight value currently used by the respective resource server, adjusting the load weight value based on the quality fluctuating value, and determining a new load weight value of the respective resource server after the current detection period according to the adjusted load weight value; and
   sending a scheduling policy characterizing the new load weight values of the plurality of resource servers to a DNS authoritative server which assigns access requests directed to the target domain name to the plurality of resource servers according to the scheduling policy.

2. The method in accordance with claim 1, further comprising:
   generating a monitoring task for the respective resource server in accordance with a monitoring detection method and a monitoring detection frequency, and recording a monitoring result corresponding to the respective resource server when the monitoring task is executed;
   collecting, in accordance with a communication address, an operation log of the respective resource server located at the communication address; and
   determining the recorded monitoring result and the collected operation log as the operation data of the respective resource server.

3. The method in accordance with claim 2, further comprising:
   identifying and removing, from the operation data, an operation data carrying an invalid state code; and
   identifying and removing, from the operation data, an operation data characterizing a resource is not applicable in the respective resource server.

4. The method in accordance with claim 1, further comprising:
   calculating a sum of a feature value of each operation data recorded in the current detection period;
   reading the historical feature value of the respective resource server after a last detection period, and calculating a sum of a feature value of historical operation data in accordance with the read historical feature value and a data amount of the historical operation data before the current detection period; and
   calculating the historical feature value of the respective resource server in the current detection period in accordance with the sum of the feature value calculated in the current detection period and the sum of the feature value of the historical operation data.

5. The method in accordance with claim 4, wherein the calculating the sum of the feature value of the each operation data recorded in the current detection period comprises:
   totaling the feature value of the each operation data in the current detection period, and taking a totaled result as the sum of the feature value of the each operation data in the current detection period;
   wherein a feature value of a current operation data is modified to a preset threshold value if the feature value of the current operation data is greater than the preset threshold value.

6. The method in accordance with claim 4, wherein the calculating the sum of the feature value of the historical operation data comprises:
   taking a product of the read historical feature value and the data amount of the historical operation data as the sum of the feature value of the historical operation data.

7. The method in accordance with claim 4, wherein the calculating the historical feature value of the respective resource server in the current detection period comprises:
   calculating a total data amount of the operation data recorded in the current detection period and the historical operation data; and
   totaling the sum of the feature value calculated in the current detection period and the sum of the feature value of the historical operation data, and taking a ratio of a totaled result and the total data amount as the historical feature value of the respective resource server in the current detection period.

8. The method in accordance with claim 1, wherein the calculating the quality fluctuating value of the respective resource server in the current detection period comprises:
   identifying a first operation data with a feature value greater than the historical feature value and a second operation data with a feature value smaller than or equal to the historical feature value in the operation data recorded in the current detection period; and
   calculating quality fluctuating values respectively for the first operation data and the second operation data, and taking a sum of calculated quality fluctuating values as the quality fluctuating value of the respective resource server in the current detection period.

9. The method in accordance with claim 1, wherein the adjusting the load weight value based on the quality fluctuating value comprises:
   in response to determining that a quality fluctuating value of a resource server is within a specified fluctuating range, keeping a load weight value currently used by the resource server unchanged;
   in response to determining that a quality fluctuating value of a resource server is greater than an upper limit value of the specified fluctuating range, increasing a load weight value currently used by the resource server in accordance with a preset adjustment amplitude; and
   in response to determining that a quality fluctuating value of a resource server is smaller than a lower limit value of the specified fluctuating range, reducing the load weight value currently used by the resource server in accordance with the preset adjustment amplitude.

10. The method in accordance with claim 1, wherein the determining a new load weight value of the respective resource server after the current detection period according to the adjusted load weight value:

in response to determining that an adjusted load weight value of a resource server is within a specified range of the load weight value, determining the adjusted load weight value as a new load weight value of the resource server after the current detection period;

in response to determining that an adjusted load weight value of a resource server is greater than an upper limit value of the specified range of the load weight value, determining the upper limit value of the specified range of the load weight value as a new load weight value of the resource server after the current detection period; and in response to determining that an adjusted load weight value of a resource server is smaller than a lower limit value of the specified range of the load weight value, determining taking the lower limit value of the specified range of the load weight value as a new load weight value of the resource server after the current detection period.

11. The method in accordance with claim 1, wherein a quality fluctuating value of a resource server of the plurality of resource servers includes a falling value, and the adjusting the load weight value based on the quality fluctuating value comprises:

in response to determining that the falling value reaches a preset falling threshold value, keeping the load weight value of the resource server unchanged, and increasing load weight values of remaining resource servers of the plurality of resource servers.

12. A device for adjusting loads of a plurality of resource servers under a target domain name, comprising a processor and a memory, wherein the memory is configured to store a computer program, and the computer program is executed by the processor to implement a method for adjusting loads of a plurality of resource servers;

wherein the method comprises:
for each respective resource server of the plurality of resource servers:
recording operation data of the respective resource server through an access interface provided by the respective resource server located at a respective IP address of the respective resource server;
determining a quality fluctuating value of the respective resource server in a current detection period in accordance with a historical feature value of the respective resource server and operation data of the respective resource server recorded in the current detection period, wherein the historical feature value is calculated based on operation data of the respective resource server, and the historical feature value indicates an average quality parameter of the respective resource server over the current detection period and one or more previous detection periods; and
reading a load weight value currently used by the respective resource server, adjusting the load weight value based on the quality fluctuating value, and determining a new load weight value of the respective resource server after the current detection period according to the adjusted load weight value; and sending a scheduling policy characterizing the new load weight values of the plurality of resource servers to a DNS authoritative server which assigns access requests directed to the target domain name to the plurality of resource servers according to the scheduling policy.

13. The device in accordance with claim 12, further comprising:

generating a monitoring task for the respective resource server in accordance with a monitoring detection method and a monitoring detection frequency, and recording a monitoring result corresponding to the respective resource server when the monitoring task is executed;

collecting, in accordance with a communication address, an operation log of the respective resource server located at the communication address; and determining the recorded monitoring result and the collected operation log as the operation data of the respective resource server.

14. The device in accordance with claim 13, further comprising:

identifying and removing, from the operation data, an operation data carrying an invalid state code; and identifying and removing, from the operation data, an operation data characterizing a resource is not applicable in the respective resource server.

15. The device in accordance with claim 12, further comprising:

calculating a sum of a feature value of each operation data recorded in the current detection period;

reading the historical feature value of the respective resource server after a last detection period, and calculating a sum of a feature value of historical operation data in accordance with the read historical feature value and a data amount of the historical operation data before the current detection period; and calculating the historical feature value of the respective resource server in the current detection period in accordance with the sum of the feature value calculated in the current detection period and the sum of the feature value of the historical operation data.

16. The device in accordance with claim 15, wherein the calculating the sum of the feature value of the each operation data recorded in the current detection period comprises:

totaling the feature value of the each operation data in the current detection period, and taking a totaled result as the sum of the feature value of the each operation data in the current detection period;

wherein a feature value of a current operation data is modified to a preset threshold value if the feature value of the current operation data is greater than the preset threshold value.

17. The device in accordance with claim 15, wherein the calculating the sum of the feature value of the historical operation data comprises:

taking a product of the read historical feature value and the data amount of the historical operation data as the sum of the feature value of the historical operation data.

18. The device in accordance with claim 15, wherein the calculating the historical feature value of the respective resource server in the current detection period comprises:

calculating a total data amount of the operation data recorded in the current detection period and the historical operation data; and totaling the sum of the feature value calculated in the current detection period and the sum of the feature value of the historical operation data, and taking a ratio of a totaled result and the total data amount as the historical feature value of the respective resource server in the current detection period.

19. A non-transitory computer storage medium storing a computer program, wherein the computer program is executed by a processor to implement a method for adjusting loads of a plurality of resource servers under a target domain name;

wherein the method comprises:
for each respective resource server of the plurality of resource servers:
recording operation data of the respective resource server through an access interface provided by the respective resource server located at a respective IP address of the respective resource server;
determining a quality fluctuating value of the respective resource server in a current detection period in accordance with a historical feature value of the respective resource server and operation data of the respective resource server recorded in the current detection period, wherein the historical feature value is calculated based on operation data of the respective resource server, and the historical feature value indicates an average quality parameter of the respective resource server over the current detection period and one or more previous detection periods; and
reading a load weight value currently used by the respective resource server, adjusting the load weight value based on the quality fluctuating value, and determining a new load weight value of the respective resource server after the current detection period according to the adjusted load weight value; and
sending a scheduling policy characterizing the new load weight values of the plurality of resource servers to a DNS authoritative server which assigns access requests directed to the target domain name to the plurality of resource servers according to the scheduling policy.

* * * * *